July 27, 1926.

G. A. PRINDLE 1,593,880

INTERNAL COMBUSTION ENGINE

Filed Oct. 28, 1921

Glen A. Prindle
INVENTOR

BY Victor J. Evans
ATTORNEY

WITNESS:

Patented July 27, 1926.

1,593,880

UNITED STATES PATENT OFFICE.

GLEN A. PRINDLE, OF REASNOR, IOWA.

INTERNAL-COMBUSTION ENGINE.

Application filed October 28, 1921. Serial No. 511,018.

This invention relates to engines, particularly to those of the internal combustion type, and has for its object the provision of a novel engine with which is associated an air compressor for forcing air under pressure through a carburetor and into the intake manifold of the engine associated with each cylinder, the compressor also operating to force compressed air into each cylinder whereby to scavenge the cylinder of any burned gases left from the previous explosion, also to furnish compressed air to the cylinder to keep the compression up to normal at all times and all altitudes, and also to provide the necessary quantity of oxygen to support combustion of the fuel even when the engine is used at extremely high altitude such as for instance when the engine is used for the purpose of propelling an aero-plane or other air craft.

A very important object of the present invention is the provision of a novel piston which is formed with a plurality of passages or ducts which extend more or less tangentially and which are for the purpose of causing turbulence or agitation of the fuel mixture or vapor, another feature being the stratification of the rich mixture in the center of the combustion chamber and the surrounding of the rich gas mixture with a leaner mixture and air under pressure whereby ignition will occur at the center where the rich mixture accumulates and will burn out an excess of air or supporting atmosphere giving all the hydrogen and carbon in the fuel a chance to combine with the oxygen in the air. The surrounding shell of air tends to insulate the cylinder wall and part of the piston head from the burning charge during the first part of the power stroke so that a large amount of heat will be prevented from being lost through the cylinder walls and piston.

Another object is the provision of an engine of this character in which the cylinder wall is surrounded by a jacket or chamber divided into two compartments, into one of which the fuel mixture is forced under pressure and into the other of which is forced compressed air, the cylinder wall being formed with separate series of ports leading into the respective compartments of this surrounding chamber.

Still another object is the provision of an engine of this character which is provided which are grouped about the ignition device or spark plug whereby the spark plug may be located at the center whereby to ignite the central mass or stratified rich mixture which accumulates within a concavity at the top of the piston.

An additional object is the provision of an engine of this type which will be comparatively simple in construction, which will develop a high degree of power and will possess the maximum efficiency at all times and all altitudes, which will be durable and satisfactory in service and an improvement in the art.

With the above and other objects and advantages in view, the invention consists in the details of construction to be hereinafter more fully described and claimed, and illustrated in the accompanying drawings, in which:—

Figure 7 is a fragmentary side elevation of one of the cylinders with the forced feed chambers and other associated parts removed.

Figure 1:
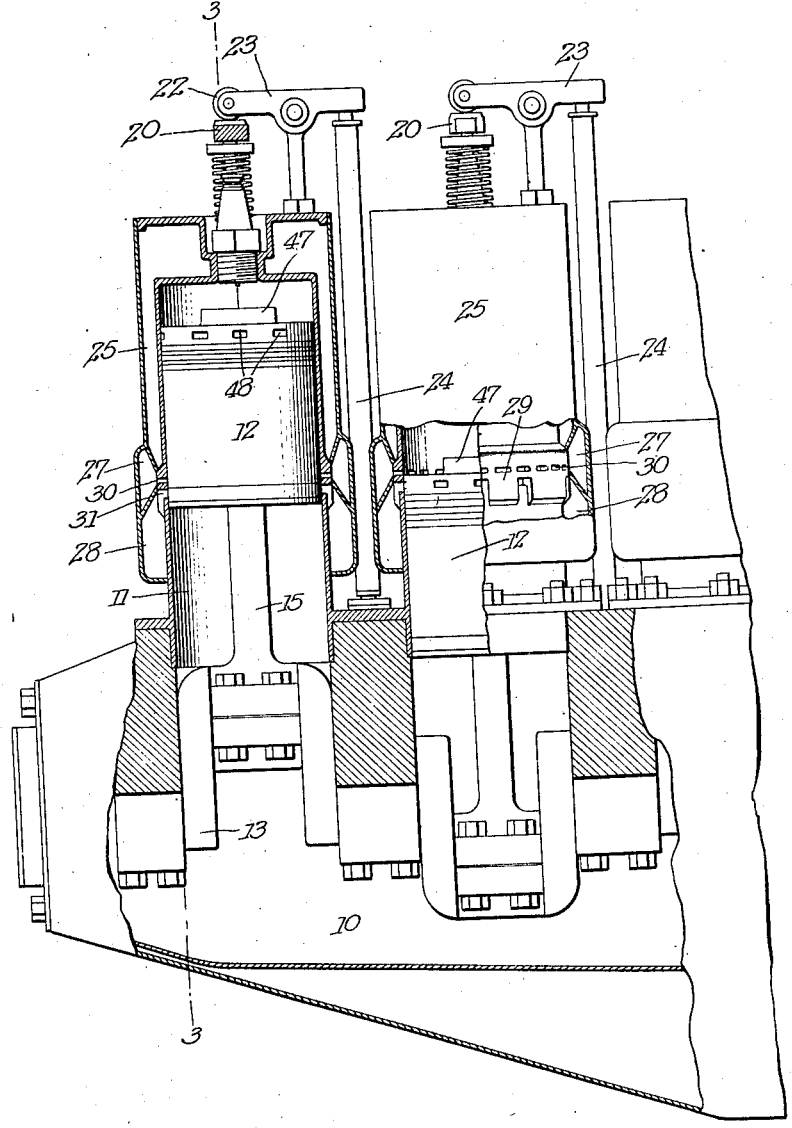
Figure 1 is a side elevation of the front portion of an engine constructed in accordance with my invention parts being broken away and in a longitudinal section.
Figure 2:
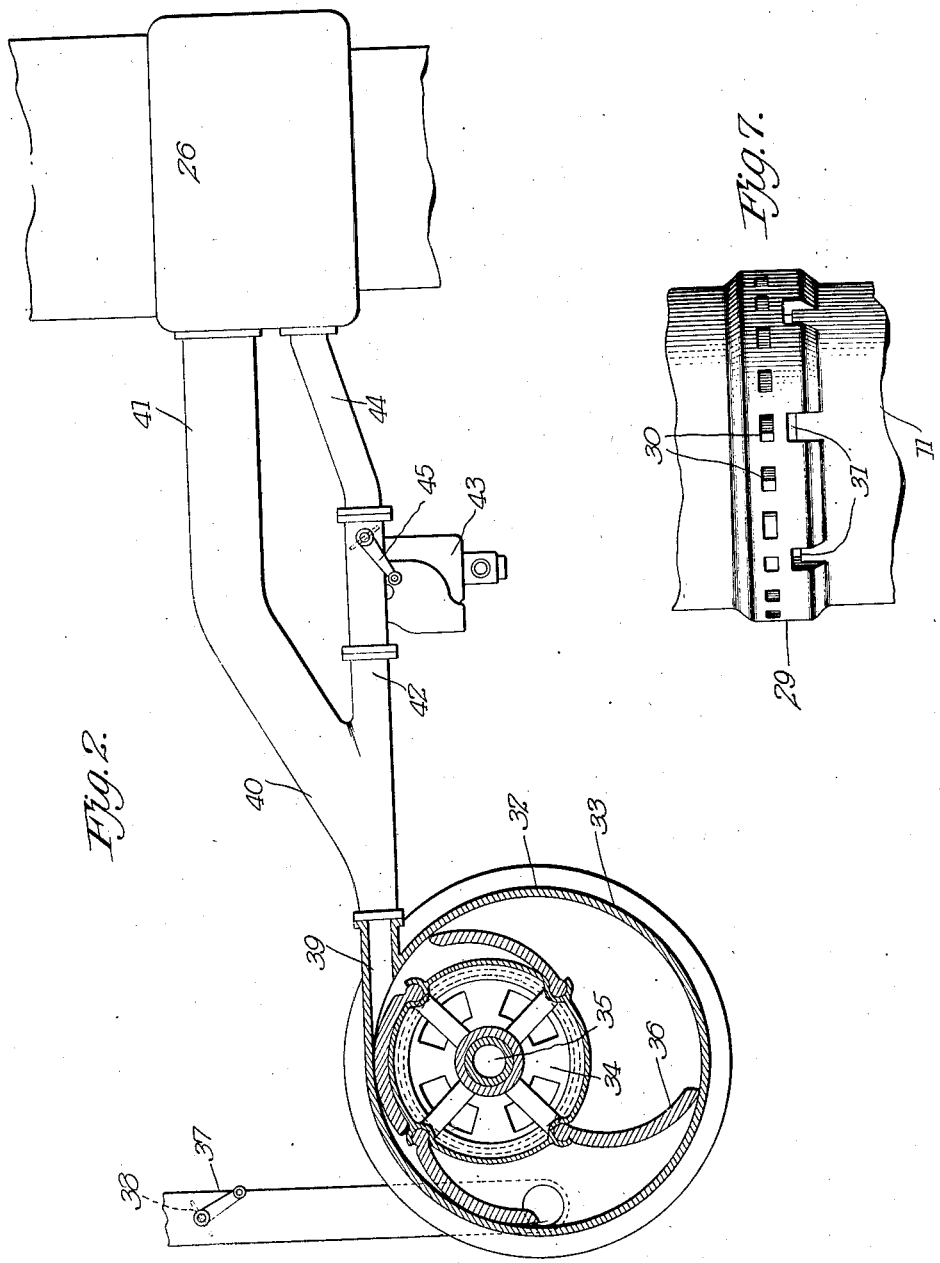
Figure 2 is a sectional view through a compressor associated with the carburetor and with the pressure feeding chamber associated with a cylinder.
Figure 3:
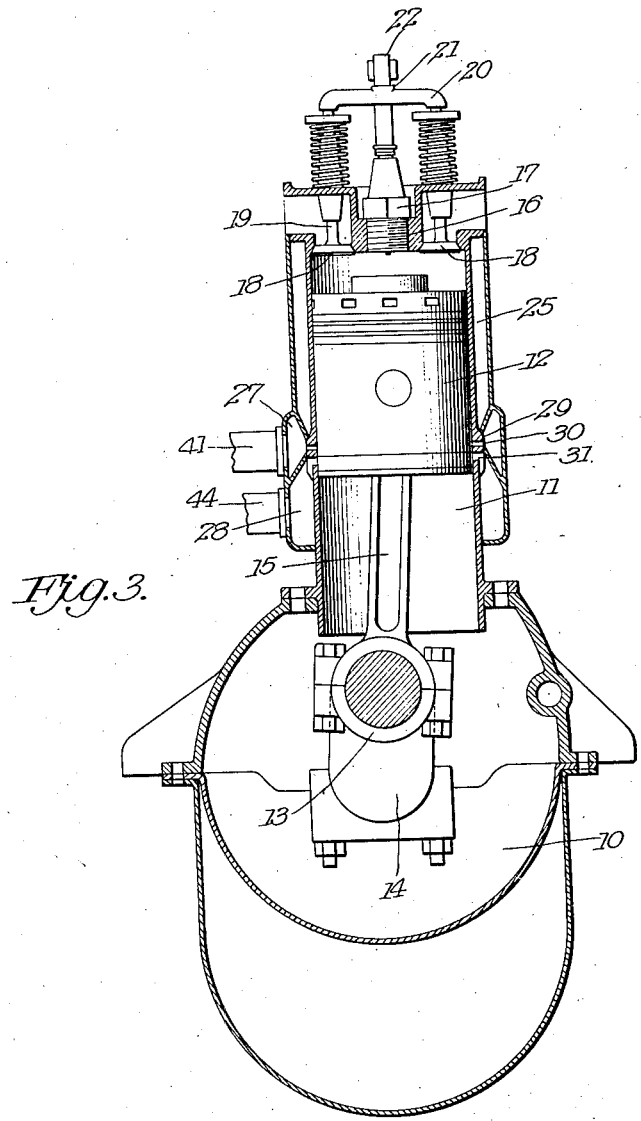
Figure 3 is a vertical transverse sectional view through the engine taken on the line 3—3 of Figure 1.

Referring more particularly to the drawings I have shown the engine as comprising the usual crank case 10 with which are associated the cylinders 11 which may be cast upon or which may be secured to the crank case by any desired means. The number of cylinders is immaterial as it will be understood that there may be a larger or smaller number provided depending upon the desired horse power of the engine and the purpose for which it is intended. Operating these pistons are connected with the crank portions 13 of a crank shaft 14 Figure 3 by means of suitable connecting rods 15 of ordinary or preferred construction. The engine as illustrated is of the two cycled type though it will be understood that it might be constructed in the four cycled type if preferred. It is also to be understood that the various cylinders are identical and that a detailed description of one is sufficient for a thorough understanding of them all.

Centrally of its top each cylinder is formed with a threaded hole 16 within which is screwed the usual spark plug 17, and provided in the top of each cylinder is a plurality of exhaust valves 18 arranged in series about the spark plug and having stems 19 suitably slidably mounted and connected with a common operating member 20 which may be of spider like formation and which has an upward projection 21 engaged by a roller 22 carried by one end of a rocker arm 23 suitably pivoted upon the top of the cylinder and operated by a tappet or push rod 24 driven from the crank shaft of the motor in the usual manner.

While I have shown and described an operative valve mechanism it is to be understood that this description and illustration is merely illustrative as it is quite conceivable that I might resort to any one of various methods of opening and closing the exhaust valves at the proper time and that I might provide a peculiar mechanism and arrangement for this purpose if I should desire or find it expedient.

Each cylinder is provided with a conventional water jacket 25 whereby to effect cooling of the cylinders and this water-jacket would naturally have communication with any radiating surface or device which might be found as forming no part of this invention.

Figure 6:
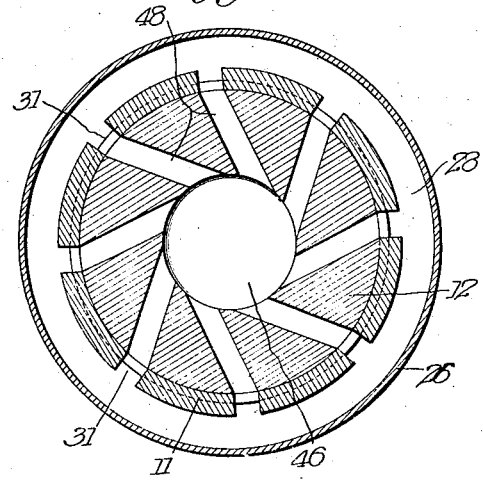
Figure 6 is a cross-sectional view on the line 6—6 of Figure 4.

Surrounding each cylinder intermediate the ends thereof is a casing or shell 26 which is internally divided by a partition 26ª into a compressed air chamber 27 and a fuel mixture chamber 28. At the intermediate portion of the shell the cylinder is preferably thickened as indicated at 29 and is formed with a plurality of ports 30 which establish communication between the cylinder and the compressed air chamber 27. Below the ports 30 the cylinder wall is formed with a series of ports or passages 31 Figure 6 which communicate with the fuel mixture chamber 28. While the cylinder is described as having a portion of its walls thickened it should be understood that such is not absolutely necessary as the thickness might be uniform throughout if preferred. It will be noted that the passages 31 are shown as extending radially through the cylinder wall while the ports 30 are shown as being inclined or somewhat tangential whereby to impart a whirling motion to the compressed air passing from the chamber 27 into the cylinder.

Associated with the engine is a suitable air compressor of any preferred type indicated by the numeral 32 and as here shown this compressor includes a casing 33 within which is mounted a rotor 34 upon a shaft 35 suitably driven from the engine and carrying a plurality of pivotally mounted blades 36. At one side this casing 33 is provided with an air inlet 37 within which is provided a butterfly valve or throttle 38 for controlling the admission of air to the compressor. The casing 33 is provided with an outlet member 39 which is connected with a pipe 40 which has one branch 41 connected and communicating with the compressed air chamber 27 and which has its other branch 42 leading to a carburetor 43 of any conventional or preferred form. Leading from the carburetor is a mixture conducting pipe 44 which is connected with and communicating with the fuel chamber 28. Associated with the outlet of the carburetor is a butterfly valve or throttle 45 which controls the passage of the rich fuel mixture to the chamber 28 as will be readily understood. It is to be noted that the compressor should be driven directly by the engine so that when the engine is in operation the compressor will also be in operation furnishing air under pressure to the air chamber 27 and also to the carburetor 43 and thence to the fuel chamber 28. The capacity of the compressor used depends upon the highest altitude at which it is desired to have the engine develop full sea-level power for instance to develop full sea-level power at say 17,000 feet the cylinders will have to be furnished by the compressor, directly and by way of the carburetor, with approximately twice their combined capacity of free air every revolution of the engine.

Figure 4:
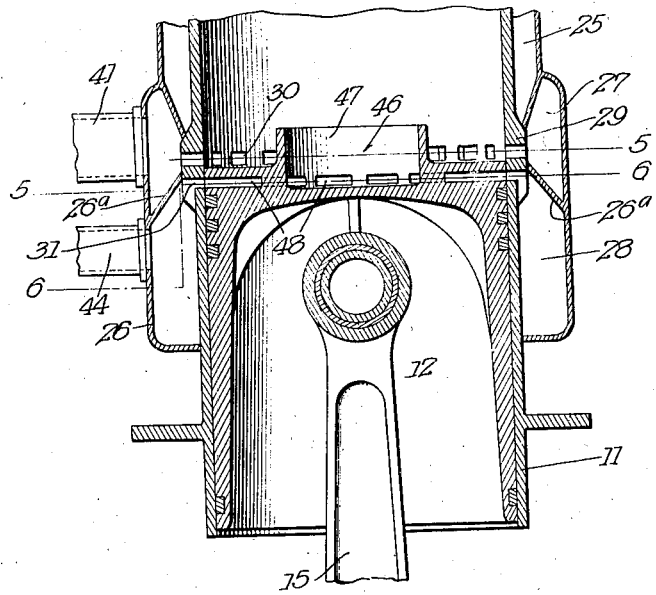
Figure 4 is an enlarged transverse sectional view taken through one of the cylinders, parts being broken away and in sections.
Figure 5:
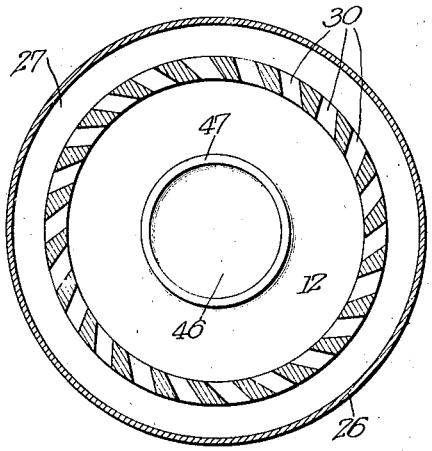
Figure 5 is a cross-sectional view on the line 5—5 of Figure 4.

Each piston 12 is of peculiar formation but is of course provided with the usual packing rings whereby to insure compression. At its center each piston is formed in its uppermost surface with a concavity 46 (Figure 4) surrounded by an upstanding flange 47, into this concavity leads a plurality of passages 48 which are shown and described as being tangential to cavity 46. I want it understood in this connection that it may be found advisable to arrange these passages to extend radially from said cavity.

The operation of the engine is as follows: Assuming that the piston is going down on the explosive stroke, as the piston nears the bottom of the stroke the exhaust valves 18 begin to open and the burned gases rush out into the open air. As the piston moves on downward the passages 48 in the piston register with certain of the ports 30 and the air forces out the products of the previous combustion from the passages 48 and the cavity 46. As the piston passes on downward further the air ports 30 are completely uncovered by the piston and the compressed air clears the piston top and the rest of the cylinder of the products of the previous explosion so as to exert a thorough scavenging action. Owing to the fact that the air ports 30 are angularly disposed or arranged somewhat tangentially as it might be described, the air will be given a rapid whirling motion for effecting this scavenging action and to keep the air next to the cylinder wall. Almost immediately after this action occurs the passages 48 begin to register with the fuel admitting passages or ports and the rich mixture within the chamber 28 then rushes in through the passages 31 and 48 and as the mixture strikes, at an angle, the side of the cavity 46 and flange 47 it is likewise given a rapid whirling motion. On account of this whirling motion, if too much gas is admitted to be held by the cavity 46 it will form a column of rich mixture directly above the cavity. At about this time or a little later the exhaust valves 18 will close and will prevent the escape of any of the fresh charge. As the piston starts upward the closing of the air and fuel admission ports obviously takes place in the reverse order of their opening. On account of the pressure in the cylinder being at this time nearly equal to the pressure in the air chamber 27, when the passages 48 register with the air ports 30, but a small amount of air will be admitted, just enough to clear the passages 48 and cover the bottom of the cavity 46. The piston moving upwardly compresses the contents of the cylinder and at the proper time the spark takes place at the point of the spark plug igniting the charge which forces the piston downward after it has reached its highest point thus completing the cycle. The throttle 38 in the air inlet of the compressor is to control the amount of air forced into the cylinder direct from the compressor, and by way of the carburetor. The throttle valve 45 which is associated with the carburetor is to control the amount of rich gas admitted to the cylinders, just enough rich gas is admitted to carry the load, and enough air, up to the capacity of the compressor, is admitted to keep the compression up as high as possible without causing autoignition.

From the foregoing description and a study of the drawings it will be apparent that I have thus provided a comparatively simple engine of the internal combustion type in which means is provided whereby to provide or force compressed air into the cylinders at an angle or tangential with respect to the walls thereof whereby to exert a whirling action which will serve to thoroughly scavenge the cylinders of any burnt gases remaining from the previous explosion and to keep the air next to the cylinder wall. There will be an ample supply of oxygen to insure perfect combustion of the fuel mixture and cause an efficient and powerful operation of the motor under all conditions. It is also to be observed that the fuel mixture is delivered to the cylinders under pressure which is controllable so that the correct amount of fuel will be admitted to carry the load regardless of the altitude at which the engine is used. It is likewise to be noted that the fuel mixture is inducted to the center of the pistons in a tangential manner and in what might be called a plurality of jets so there will be provided a whirling action which will provide or cause the formation of a column of relatively rich mixture located at the center of the piston at such a point as to insure ignition of the charge even under the most adverse climatic or altitudinous conditions and regardless of the rarification of the air. It is also to be observed that owing to the fact that the air compressing mechanism is driven directly by the engine, at all times the action will be automatic and no specific attention is necessary to insure proper action of the compressor and the proper feeding of pressure through the carburetor and to the fuel chamber and through the compressed air conduit to the compressed air admission ports in the cylinder wall for effecting the scavenging action and also for providing a comparatively lean mixture which surrounds the central column of very rich mixture. The advantage of the relatively lean mixture which surrounds the relatively rich mixture in a whirling sheet or mass of relatively cylindrical form is that there will be provided an excess of oxygen to insure the complete combustion of the fuel; there is also provided a certain species of insulation between the hottest point of the ignited charge and the cylinder walls which will operate to prevent the conduction of the major portion of the heat to the cylinder walls and thus conserve the heat and greatly improve the running and efficiency of the engine under all conditions.

While I have shown and described the preferred embodiment of the invention, it is of course to be understood that I reserve the right to make such changes in the form, construction and arrangements of parts as will not depart from the spirit of the invention or the scope of the subjoined claims.

Having thus described my invention I claim:—

1. In an internal combustion engine, a cylinder having the combination of valve controlled exhaust ports at the upper end, a series of air inlet ports entirely surrounding the cylinder and passing thru the cylinder wall at a point immediately above the lowest position attained by the top of the piston, said air inlet ports being placed, at an angle, all in the same relative position, with respect to the radii of the cylinder, and a series of rich gas inlet ports entirely surrounding the cylinder and passing thru the cylinder wall in such a position that they register with the passages in the piston when the piston reaches its lowest position.

2. In an internal combustion engine, a cylinder having the combination of valve controlled exhaust ports at the upper end, a series of air inlet ports entirely surrounding the cylinder and passing thru the cylinder wall at a point immediately above the lowest position attained by the top of the piston, said air inlet ports being placed, all in the same relative position, at an angle, with respect to the radii of the cylinder, a series of rich gas inlet ports entirely surrounding the cylinder and passing thru the cylinder wall in such a position that they register with the passages in the piston when the piston reaches its lowest position, a passage for air surrounding the air inlet ports and a passage for rich gas surrounding the rich gas inlet ports.

3. In an internal combustion engine, a cylinder having the combination of valve controlled exhaust ports at the upper end, a series of air ports spaced entirely around the cylinder and places at an angle with respect to the radii of the cylinder and passing thru the cylinder wall immediately above the piston when the piston is in its lowest position, a series of rich gas ports spaced entirely around the cylinder and placed in such a position that they register with the passages in the piston when the piston is in its lowest position, a chamber for air surrounding the air ports, a chamber for rich gas, surrounding the rich gas ports, and means to supply air under pressure to the interior of the cylinder and to supply rich gas under pressure to the interior of the cylinder, the air and rich gas being admitted to the interior of the cylinder at certain intervals determined by the movement of the piston past the air and the rich gas ports.

4. In an internal combustion engine the combination of a piston having a central cavity in the top thereof, a flange extending above the piston and surrounding the cavity and a series of passages near the top of the piston leading from the periphery into the central cavity; said passages being at an angle with respect to the radii of the piston, and a cylinder having valve controlled exhaust ports at the upper end, a series of air inlet ports surrounding the cylinder and passing thru the cylinder wall at a point immediately above the lowest position attained by the top of the piston; said air inlet ports being placed at an angle with respect to the radii of the cylinder, and a series of rich gas inlet ports surrounding the cylinder and passing thru the cylinder wall in such a position that they register with the passages in the piston when the piston reaches its lowest position; the piston and the passages in the piston controlling the passage of air thru the air inlet ports and the passage of rich gas thru the rich gas inlet ports.

5. In an internal combustion engine the combination of a cylinder having air ports, a chamber surrounding said air ports, rich gas ports (each rich gas port being directly below an air port), a chamber surrounding the rich gas ports, valve controlled exhaust ports, means to supply air under pressure to the interior of the cylinder and to supply rich gas under pressure to the interior of the cylinder, a piston suitably slidably mounted within the cylinder, the piston having passages, cavity and flange, said piston controlling said air ports and said rich gas ports when the engine is in operation, all substantially as set forth and for the purpose specified.

In testimony whereof I affix my signature.

GLEN A. PRINDLE.